United States Patent
Wang

(10) Patent No.: US 9,813,719 B2
(45) Date of Patent: Nov. 7, 2017

(54) SIGNALING HRD PARAMETERS FOR BITSTREAM PARTITIONS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/741,291

(22) Filed: Jun. 16, 2015

(65) Prior Publication Data
US 2015/0373356 A1 Dec. 24, 2015

Related U.S. Application Data

(60) Provisional application No. 62/013,965, filed on Jun. 18, 2014.

(51) Int. Cl.
*H04N 19/503* (2014.01)
*H04N 19/196* (2014.01)
*H04N 19/136* (2014.01)
*H04N 19/187* (2014.01)
*H04N 19/105* (2014.01)
(Continued)

(52) U.S. Cl.
CPC ......... *H04N 19/196* (2014.11); *H04N 19/105* (2014.11); *H04N 19/136* (2014.11); *H04N 19/184* (2014.11); *H04N 19/187* (2014.11); *H04N 19/30* (2014.11); *H04N 19/31* (2014.11); *H04N 19/423* (2014.11); *H04N 19/44* (2014.11); *H04N 19/46* (2014.11); *H04N 19/463* (2014.11);
(Continued)

(58) Field of Classification Search
CPC ............. B60C 23/0486; B60C 23/061; B60W 40/105; B60W 40/13; H04N 19/105; H04N 19/136; H04N 19/184; H04N 19/187; H04N 19/196; H04N 19/30; H04N 19/31; H04N 19/423; H04N 19/44; H04N 19/46; H04N 19/463; H04N 19/503; H04N 19/70
USPC .................................................... 375/240.12
See application file for complete search history.

(56) References Cited

U.S. PATENT DOCUMENTS

2004/0005007 A1* 1/2004 Viscito ............. H04N 21/23406
375/240.25
2005/0175098 A1* 8/2005 Narasimhan ....... H04N 21/2368
375/240.12
(Continued)

FOREIGN PATENT DOCUMENTS

CA 2871828 4/2014

OTHER PUBLICATIONS

ATSC Candidate Standard: Video—HEVC (A/341) Doc.S34-168r6, Jan. 3, 2017.*
(Continued)

*Primary Examiner* — Shan Elahi

(57) ABSTRACT

In one example, a device for coding (e.g., encoding or decoding) video data includes a memory configured to store video data, and a video coder configured to code hypothetical reference decoder (HRD) parameters for each sub-layer of each bitstream partition of a video bitstream; and process the video bitstream using the HRD parameters. The video coder may code the HRD parameters in the form of a loop over the HRD parameters that is iterated for each of the sub-layers, and/or indexes to respective sets of HRD parameters for each of the sub-layers.

30 Claims, 5 Drawing Sheets

(51) Int. Cl.

| | | |
|---|---|---|
| *H04N 19/70* | (2014.01) | |
| *H04N 19/184* | (2014.01) | |
| *H04N 19/31* | (2014.01) | |
| *H04N 19/463* | (2014.01) | |
| *H04N 19/85* | (2014.01) | |
| *H04N 19/46* | (2014.01) | |
| *H04N 19/30* | (2014.01) | |
| *H04N 19/44* | (2014.01) | |
| *H04N 19/423* | (2014.01) | |

(52) U.S. Cl.
CPC .......... *H04N 19/503* (2014.11); *H04N 19/70* (2014.11); *H04N 19/85* (2014.11)

(56) References Cited

U.S. PATENT DOCUMENTS

| | | | |
|---|---|---|---|
| 2008/0317378 A1 | 12/2008 | Steinberg et al. | |
| 2010/0208796 A1* | 8/2010 | Luo ................ | H04N 19/597 375/240.02 |
| 2011/0038424 A1* | 2/2011 | Luo ................ | H04N 19/597 375/240.26 |
| 2012/0269276 A1* | 10/2012 | Hong ............... | H04N 19/70 375/240.25 |
| 2013/0016222 A1 | 1/2013 | Jiang et al. | |
| 2013/0170561 A1* | 7/2013 | Hannuksela ..... | H04N 21/23424 375/240.25 |
| 2013/0279600 A1* | 10/2013 | Toma .............. | H04N 19/176 375/240.25 |
| 2013/0287093 A1* | 10/2013 | Hannuksela ..... | H04N 19/00769 375/240.02 |
| 2014/0003487 A1* | 1/2014 | Haque ............. | H04N 19/70 375/240.02 |
| 2014/0003489 A1* | 1/2014 | Hannuksela ..... | H04N 19/70 375/240.02 |
| 2014/0086333 A1 | 3/2014 | Wang | |
| 2014/0098894 A1 | 4/2014 | Wang | |
| 2014/0098895 A1 | 4/2014 | Wang | |
| 2015/0373347 A1 | 12/2015 | Wang | |
| 2015/0373373 A1 | 12/2015 | Wang | |

OTHER PUBLICATIONS

Jeremiassen et al, A DSP with caches—A study of the GSM-EFR Codec on the TI C6211, 1999.*

Wang et al, A compression-based area-efficient recovery architecture for nonvolatile processors, 2012.*

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Deshpande "MV-HEVC/SHVC HLS: On Bitstream Partition Buffer", JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q0101-v2, XP030116016, 14 pp.

Hannuksela, et al., "MV-HEVC/SHVC HLS / JCT-VC AHG20: Multi-layer HRD operation—VPS VUI signalling", Joint Collaborative Team on Video Coding (JCT-VC) of ITU-T SG 16 WP 3 and ISO/IEC JTC 1, 15th Meeting, Geneva, Oct. 2013, vol. JCTVC-00164, XP030115189, 4 pp.

Hannuksela, et al., "MV-HEVC/SHVC HLS / JCT-VC AHG20: Multi-layer HRD operation", JCT-VC Meeting; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-00164v2, Oct. 2013, XP055209851, 14 pp.

Sjoberg, et al., "Overview of HEVC High-Level Syntax and Reference Picture Management," IEEE Transactions on circuits and Systems for Video Technology, vol. 22 (12), XP011487804, Dec. 2012, pp. 1858-1870.

Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668.

Tech, et al., "MV-HEVC Draft Text 8", Joint Collaborative Team on 3D Video Coding Extensions of ITU-T SG 16 WP 3 and ISO/IEC JTC 1, vol. JCT3V-H100v4, Mar. 29-Apr. 4, 2014, XP055210131, 164 pp.

Wang, et al. "MV-HEVC/SHVC: Signalling and use of HRD parameters for bitstream partitions", JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0231, XP030116533, 3 pp.

Wang, et al., "AHG10 output text", Joint Collaborative Team on Video Coding (JCT-VC) of ITU-T SG 16 IVP 3 and ISO/IEC JTC 1, vol. JCTVC-R8010v1-JCT3V-I0010v1, Jun. 30-Jul. 9, 2014, XP055209600, 154 pp.

Wang, et al: "High Efficiency Video Coding (HEVC) Defect Report 4", Joint Collaborative Team on Video Coding (JCT-VC) of ITU-T SG 16 WP 3 and ISO/IEC JTC 1, Document: JCTVC-Q1003 (v.1), Mar. 27-Apr. 4, 2014, XP055209579, 314 pp.

Wien, "High Efficiency Video Coding", Coding Tools and specification, Chapter 12, Sep. 30, 2014, pp. 291-308.

Wien, "High Efficiency Video Coding", Coding Tools and specification, Chapter 5, Sep. 30, 2014, pp. 133-160.

Wien, "High Efficiency Video Coding", Coding Tools and specification, Preface and Contents, Sep. 30, 2014, 22 pages.

Tech, et al., "MV-HEVC Draft Text 8," Joint Collaborative Team on Video Coding (JCT-VC) of ITU-T SG 16 WP 3 and ISO/IEC JTC 1, Document: JCT3V-H1002-v5, Mar. 29-Apr. 4, 2014, 164 pp.

(56) References Cited

OTHER PUBLICATIONS

Chen, et al., "Preliminary version of High efficiency video coding (HEVC) scalable extension Draft 6," Joint Collaborative Team on Video Coding (JCT-VC) of ITU-T SG 16 WP 3 and ISO/IEC JTC 1, Document: JCTVC-Q1008v2, Mar. 27-Apr. 4, 2014, 160 pp.
Sullivan, "Ad hoc group report: Layered coding constraint specifications and capability indications (AHG10)," Joint Collaborative Team on Video Coding (JCT-VC) of ITU-T SG 16 WP 3 and ISO/IEC JTC 1, Document: JCTVC-R0010/JCT3V-I0010, Jun. 30-Jul. 9, 2014, 40 pp.
Wang, et al., "AHG10 output text," Joint Collaborative Team on Video Coding (JCT-VC) of ITU-T SG 16 WP 3 and ISO/IEC JTC 1, Document: JCTVC-R0010v1/ JCT3V-I0010v1, Jun. 30-Jul. 9, 2014, 160 pp.
Tech, et al., "Mv-Hevc Draft Text 8," Joint Collaborative Team on Video Coding (Jct-Vc) of Itu-T Sg 16 Wp 3 and Iso/Iec Jtc 1, Document: JCT3V-H1002-v4, Mar. 29-Apr. 4, 2014, 170 pp.
Ramasubramonian, et a., "SHVC/MV-HEVC level definitions and related decoder capability requirements," Joint Collaborative Team on Video Coding (JCT-VC) of ITU-T SG 16 WP 3 and ISO/IEC JTC 1, Jun. 30-Jul. 9, 2014, Document: R0043v4/JCT3V-I0022v4, 7 pp.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
Wang, et al., "AHG10 output text," Joint Collaborative Team on Video Coding (JCT-VC) of ITU-T SG 16 WP 3 and ISO/IEC JTC 1, Document: JCTVC-R0010v1, JCT3V-I0010v1, Jun. 30-Jul. 9, 2014, 160 pp.
International Search Report and Written Opinion from International Application No. PCT/US2015/036175, dated Sep. 7, 2015, 17 pp.
Response to Written Opinion dated Sep. 7, 2015, from International Application No. PCT/US2015/036175, filed on Feb. 1, 2016, 5 pp.
Wang, et al., "High Efficiency Video Coding (HEVC) Defect Report," JCT-VC Meeting; Mar. 27-Apr. 4, 2014; Joint Collaborative Team on Video Coding (JCT-VC) of ITU-T SG 16 WP 3 and ISO/IEC JTC 1; No. JCTVC-Q1003, 314 pp.
Second Written Opinion from International Application No. PCT/US2015/036175, dated May 23, 2016, 5 pp.
Response to Written Opinion dated May 23, 2016, from International Application No. PCT/US2015/036175, filed on Jul. 13, 2016, 17 pp.
International Preliminary Report on Patentability from International Application No. PCT/US2015/036175, dated Sep. 8, 2016, 15 pp.
Nguyen K., et al., "Implementation of H.264/AVC Encoder on Coarse-grained Dynamically Reconfigurable Computing System," Fourth International Conference on Communications and Electronics (ICCE), 2012, 6 pages. (The year of publication is sufficiently earlier than the effective U.S. filed and any foreign priority date so that the particular month of publication is not in issue.).
Rajovic V., et al., "An Image Codec with Minimum Memory Size," 2nd Mediterranean Conference on Embedded Computing (MECO), 2013, 4 page. (The year of publication is sufficiently earlier than the effective U.S. filed and any foreign priority date so that the particular month of publication is not in issue.).
Non-Final Office Action from U.S. Appl. No. 14/741,279 dated Apr. 4, 2017 (22 pages).
Non-Final Office Action from U.S. Appl. No. 1/741,298 dated Mar. 31, 2017 (20 pages).

\* cited by examiner

SIGNALING HRD PARAMETERS FOR BITSTREAM PARTITIONS

This application claims the benefit of U.S. Provisional Application No. 62/013,965, filed Jun. 18, 2014, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling hypothetical reference decoder (HRD) parameters for bitstream partitions. That is, the techniques of this disclosure may improve signaling of HRD parameters for bitstream partitions, e.g., in multi-layer video coding. A video bitstream may include various layers in various dimensions, such as a temporal dimension, a view dimension (e.g., for multi-view video data), a scalability dimension (e.g., for scalable video coding), or the like. Various techniques, which may be used alone or in any combination, are described that may improve HRD parameter signaling for bitstream partitions, any or all of which may be individually extracted for subsequent decoding by a video decoder.

In one example, a method of coding (e.g., encoding or decoding) video data includes coding a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, coding HRD parameters for the number of sub-layers as indicated by the value for the syntax element, and processing the bitstream using the HRD parameters.

In another example, a device for coding (e.g., encoding or decoding) video data includes a memory configured to store video data, and a video coder configured to code a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, code HRD parameters for the number of sub-layers as indicated by the value for the syntax element, and process the bitstream using the HRD parameters.

In another example, a device for coding (e.g., encoding or decoding) video data includes means for coding a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, means for coding HRD parameters for the number of sub-layers as indicated by the value for the syntax element, and means for processing the bitstream using the HRD parameters.

In another example, a computer-readable storage medium is encoded with instructions that, when executed, cause one or more processors to code a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, code HRD parameters for the number of sub-layers as indicated by the value for the syntax element, and process the bitstream using the HRD parameters.

The details of one or more examples are set forth in the accompanying drawings and the description below. Other features, objects, and advantages will be apparent from the description and drawings, and from the claims.

DETAILED DESCRIPTION

Figure 1:
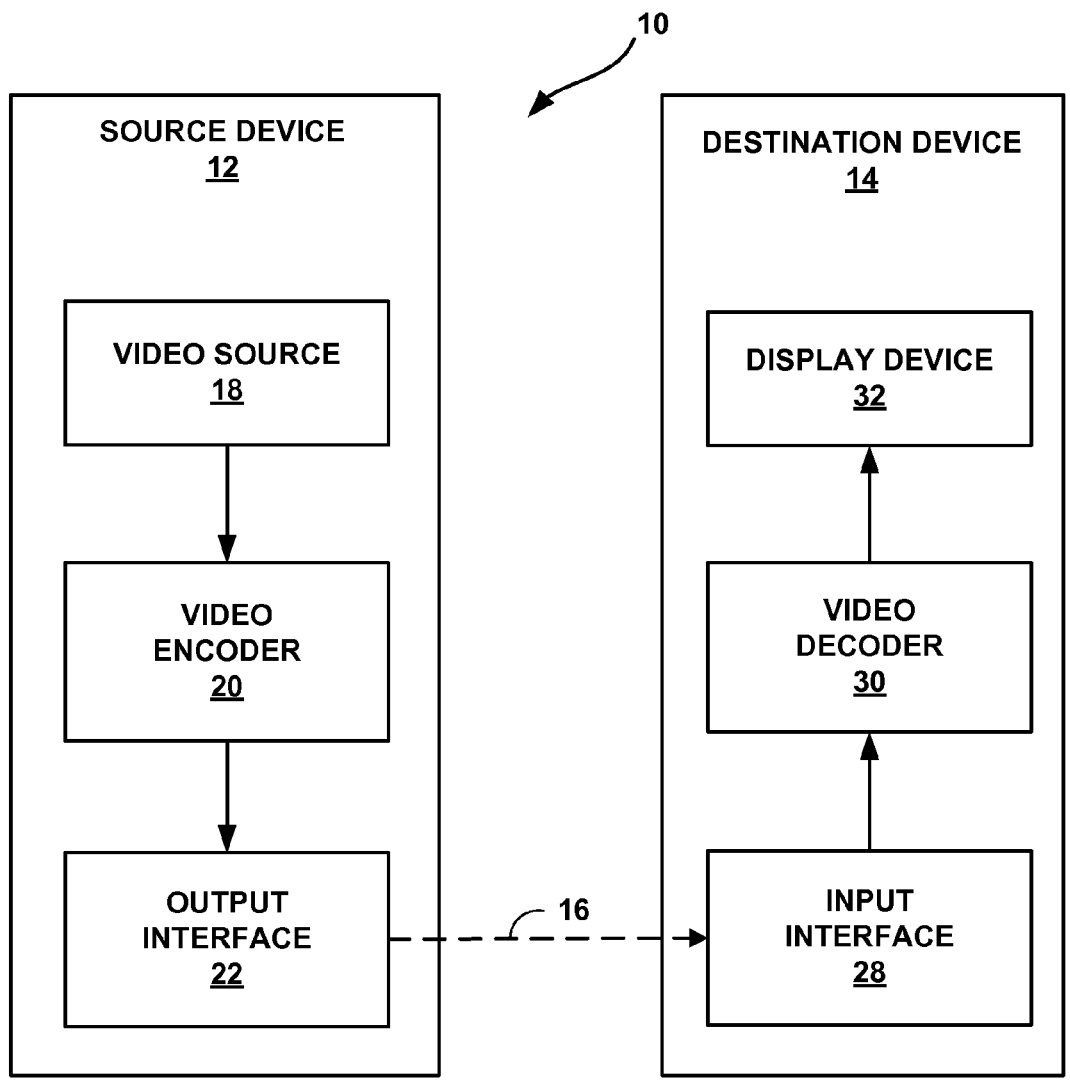
FIG. 1 is a block diagram illustrating an example video encoding and decoding system that may utilize techniques for improving hypothetical reference decoder (HRD) parameter signaling.

In general, this disclosure describes techniques related to coding (e.g., encoding or decoding) hypothetical reference decoder (HRD) parameters. In general, HRD parameters are used to manage timelines as well as to control sizes of coded picture for a video coding process. For example, a video coder may use the HRD parameters to determine when to extract an encoded picture from a coded picture buffer (CPB), for purposes of decoding the picture, and/or to determine when to extract, output, and/or remove a decoded picture from a decoded picture buffer (DPB).

A video bitstream may include coded video data that can be used by a variety of different decoding and rendering devices. For instance, a video decoder may support various video coding standard profiles and levels, which may implement various decoding tools. Similarly, a video rendering device (e.g., a display) may support various rendering capabilities (e.g., refresh rate/frame rate, number of views that can be played simultaneously, interlaced or progressive scan playback, or the like). In this manner, a single video bitstream may be usable by multiple different video decoders and rendering devices.

As one example, a video bitstream may be said to support temporal scalability when various frame rates can be rendered from the video bitstream. For example, the same video bitstream may be used to render video having frame rates of 15 frames per second (FPS), 30 FPS, 60 FPS, 120 FPS, and 240 FPS. In general, each of these various playback frame rates corresponds to a set of one or more "sub-layers" of the bitstream. Each progressively higher layer includes all frames at that sub-layer and below that sub-layer. Thus, the pictures for the 15 FPS playback may include sub-layer 0 pictures, the pictures for the 30 FPS playback may include sub-layers 0 and sub-layer 1 pictures, the pictures for the 60 FPS playback may include pictures of sub-layers 0, 1, and 2, and so on.

In this manner, when a device is configured to perform playback at a frame rate lower than a maximum frame rate supported by a video bitstream, the device may perform sub-bitstream extraction from the bitstream, to extract and decode only the pictures needed for playback. Continuing the example above, if the device were to determine to perform 60 FPS playback, the device may extract the pictures of sub-layers 0, 1, and 2, and decode only these pictures (i.e., without decoding pictures of sub-layers 3 and 4).

A video parameter set (VPS) syntax structure may include data indicating a maximum number of sub-layers that can be included in a bitstream. Thus, HRD parameters may be signaled for each of the maximum number of sub-layers. However, sub-bitstream extraction (e.g., for purposes of temporal scalability) may result in an extracted sub-bitstream having fewer than the maximum number of sub-layers. Rather than signaling information for each of the maximum number of sub-layers, this disclosure describes techniques for signaling HRD parameters only for the number of sub-layers that are actually included in a bitstream (which may be less than or equal to the maximum number of sub-layers indicated by the VPS). In this manner, these techniques may achieve a bit savings relative to techniques in which HRD parameters are signaled for each of the maximum number of sub-layers.

Similarly, this disclosure describes techniques for signaling HRD parameters for each sub-layer of each partition of a bitstream. For example, the VPS may include a loop of parameters that iterates over each of the number of possible output layer sets, and for each possible output layer sets, signals HRD parameters for sub-layers included in the corresponding output layer set.

Furthermore, this disclosure describes techniques for conditionally signaling video coding layer (VCL) HRD parameters in a bitstream partition initial arrival time supplemental enhancement information (SEI) message. This may overcome certain potential deficiencies of existing techniques in which such parameters may be signaled unnecessarily in certain conditions.

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services—Coding of moving video," *High Efficiency Video Coding*, ITU-T H.265, April 2013. However, these techniques may be applied to other video coding standards as well. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The H.265 standard was recently finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from phenix.it-sudparis.eu/jct/doc_end_user/documents/17_Valencia/wg11/JCTVC-Q1003-v1.zip. The multi-view extension to HEVC, namely MV-HEVC, is also being developed by the JCT-3V. A recent Working Draft (WD) of MV-HEVC, referred to as MV-HEVC WD8 hereinafter, is available from phenix.it-sudparis.eu/jct2/doc_end_user/documents/8_Valencia/wg11/JCT3V-H1002-v5.zip. The scalable extension to HEVC, named SHVC, is also being developed by the JCT-VC. A recent Working Draft (WD) of SHVC and referred to as SHVC WD6 hereinafter, is available from phenix.it-sudparis.eu/jct/doc_end_user/documents/17_Valencia/wg11/JCTVC-Q1008-v2.zip.

MV-HEVC WD8 and SHVC WD6 include the specification of a bitstream partition based HRD operation, called bitstream-partition-specific HRD operation, wherein layers of a bitstream can be divided into more than one bitstream partitions, and the HRD may operate based on bitstream-partition-specific HRD parameters.

JCTVC-R0043v5 (available at phenix.int-evey.fr/jct/doc_end_user/documents/18_Sapporo/wg11/JCTVC-R0043-v5.zip) and the AHG10 output text in attachments to Sullivan, "Ad hoc group report: Layered coding constraint specifications and capability indications (AHG10)," Joint Collaborative Team on Video Coding (JCT-VC) of ITU-T SG 16 WP 3 and ISO/IEC JTC 1/SC 29/WG 11, 18$^{th}$ Meeting: Sapporo, J P, 30 June to 9 Jul. 2014, JCTVC-R0010v2, (hereinafter, "JCTVC-R0010v2"), available at phenix.int-evey.fr/jct/doc_end_user/documents/18_Sapporo/wg11/JCTVC-R0010-v2.zip include specifications of a bitstream partition based signalling of profile/tier/level and conformance definition. The approach is summarized as follows:

For each output layer set, one or more partitioning schemes of layers into partitions are signalled. Each bitstream partition can contain one or more layers.

A set of profile, tier, and level (PTL) is signalled for each bitstream partition.

All level limits and restrictions, except for the three on picture width, picture height, and sub-DPB size that naturally layer specific, are specified to be bitstream partition specific.

A decoder's decoding capability is expressed as conforming to a list of PTL triplets, wherein the number of entries in the list indicates the number of single-layer decoders used to build the multi-layer decoder, and each PTL triplet indicates the PTL of one of the single-layer decoders.

A decoder that conforms to a list of PTL triplets is required to be able to decode any output layer set for which there is at least one partitioning scheme that satisfies the following condition: for each bitstream partition of the partitioning scheme one of the single-layer decoders of the multi-layer decoder can be exclusively assigned for decoding the bitstream partition.

The bitstream partition based HRD operation in MV-HEVC WD8 and SHVC WD6 is used with modifications to work better with multiple partitioning schemes.

In the bitstream partition based HRD operation in MV-HEVC WD8, SHVC WD6, and JCTVC-R0010v2, HRD parameters are signalled for each bitstream partition. The existing methods for signalling of HRD parameters for bitstream partitions may encounter the following shortcomings:

1) Each hrd_parameters( ) syntax structure contains information for vps_max_sub_layer_minus1+1 sub-layers, even the syntax structure applies to a bitstream has a number of sub-layers that is less than vps_max_sub_layer_minus1+1. In this case some bits are purely wasted.

2) For each bitstream partition, the HRD parameters for only the highest sub-layer is signalled, thus the conformance of a temporal subset of the bitstream partition cannot be defined and there is no way to consume only a temporal subset of an output layer set in an interoperable manner.

3) In the bitstream partition initial arrival time SEI message, both of the following two cases that should never occur can occur:
   a. When NalHrdBpPresentFlag is 1, the initial arrival delay for VCL HRD parameters through vcl_initial_arrival_delay[i] syntax elements are not signalled even if VclHrdBpPresentFlag is equal to 1. In this case, the VCL HRD conformance cannot be defined.
   b. When NalHrdBpPresentFlag is 0 the initial arrival delay for VCL HRD parameters through vcl_initial_arrival_delay[i] syntax elements are signalled even if VclHrdBpPresentFlag is equal to 0. In this case, those signalling are purely wasting bits.

Thus, as noted above, this disclosure describes various techniques that may be used alone or in any combination, and that may overcome any or all of the shortcomings discussed above. A summary of the techniques of this disclosure is given below, with a detailed implementation of some methods provided in later sections. In general, the numbered items below may address the numbered shortcomings discussed above:

1) Each hrd_parameters( ) syntax structure contains information for the number of sub-layers that is needed, as signalled by a syntax element, e.g. named num_sub_layer_hrd_minus1[i].

2) For each bitstream partition, the HRD parameters for each sub-layer are signalled. This can be achieved by either adding a loop with the number entries equal to the number of sub-layers in the output layer set for the syntax elements indicating the number of delivery schedules, the index to the list of hrd_parameters( ) syntax structures, and the index to the list of delivery schedules in the indicated hrd_parameters( ) syntax structure, or simply signal only an index to the list of hrd_parameters( ) syntax structure and use all delivery schedules in the indicated hrd_parameters( ) syntax structure.

3) In the bitstream partition initial arrival time SEI message syntax is changed such that the initial arrival delay for VCL HRD parameters are present if and only if VclHrdBpPresentFlag is equal to 1.

FIG. 1 is a block diagram illustrating an example video encoding and decoding system 10 that may utilize techniques for improving hypothetical reference decoder (HRD) parameter signaling. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for improving hypothetical reference decoder (HRD) parameter signaling. In other examples, a source device and a destination device may include other components or arrangements. For example, source device 12 may receive video data from an external video source 18, such as an external camera. Likewise, destination device 14 may interface with an external display device, rather than including an integrated display device.

As noted above, source device 12 includes output interface 22 and destination device 14 includes input interface 28. In some examples, output interface 22 represents a transmitter and input interface 28 represents a receiver. In other examples, output interface 22 and input interface 28 represent examples of transceivers (that is, interfaces capable of both transmitting and receiving data signals wirelessly). The transceivers may be configured to send and receive video data in wireless signals. For example, output interface 22, when implemented as a transceiver, may send a data signal (e.g., computer-readable medium 16) including encoded video data, while input interface 28, when implemented as a transceiver, may receive a data signal (e.g., computer-readable medium 16) including encoded video data. As discussed above, video encoder 20 may provide the encoded video data to output interface 22, while input interface 28 may provide encoded video data to video decoder 30.

The illustrated system 10 of FIG. 1 is merely one example. Techniques for improving hypothetical reference decoder (HRD) parameter signaling may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the treeblock with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs) or transform trees as noted above. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

In accordance with one example of the techniques of this disclosure, a video coder (such as video encoder 20 or video decoder 30) may be configured to code video usability information (VUI) in a video parameter set (VPS), including hypothetical reference decoder (HRD) parameters. Table 1 below describes an example VPS VUI byte sequence payload (BSP) for HRD parameters in accordance with certain techniques of this disclosure. In Table 1, italicized text indicates additions relative to the data structure described in the variant 2 attachment to JCTVC-R0010v2, while text identified using brackets and "removed:" (for example, [removed: "example removed text"] represents removals from the data structure described in the variant 2 attachment to JCTVC-R0010v2.

parameters that are common for all sub-layers are not present in the i-th hrd_parameters( ) syntax structure and are derived to be the same as the (i−1)-th hrd_parameters( ) syntax structure.

num_sub_layer_hrd_minus1[i] plus 1 specifies the number of fixed_pic_rate_general_flag[ ] syntax elements in the i-th hrd_parameters( ) syntax structure. The value of num_sub_layer_hrd_minus1[i] shall be in the range of 0 to vps_max_sub_layers_minus1, inclusive.

bsp_hrd_params [removed: "parameters"]_present_flag [h][i] equal to 1 specifies that the HRD parameters are present for all bitstream parathions of the i-th partitioning schemes of the h-th OLS. bsp_hrd_params [removed: "parameters"]_present_flag[h][i] equal to 0 specifies that the HRD parameters are not present for any bitstream partitition of the i-th partitioning scheme of the h-th OLS.

num_bsp_schedules [removed: "sched_combinations"]_minus1[h][i][t] plus 1 specifies the number of [removed: "combinations of"] delivery schedules [removed: "and hrd_parameters( )"] specified for bitstream partitions of the i-th partitioning scheme of the h-th OLS when HighestTid is

TABLE 1

|  | Descriptor |
| --- | --- |
| vps_vui_bsp_hrd_params [removed: "parameters"]( ) { |  |
|   vps_num_add_hrd_params [removed: "parameters"] | ue(v) |
|   for(i = vps_num_hrd_parameters; i < vps_num_hrd_parameters + |  |
|     vps_num_add_hrd_params [removed: "parameters"]; i++ ) { |  |
|     if( i > 0 ) { |  |
|       cprms_add_present_flag[i] | u(1) |
|       num_sub_layer_hrd_minus1[ i] | ue(v) |
|     } |  |
|     hrd_parameters(cprms_add_present_flag[i], num [removed: "vps_max"]_sub_hrd [removed: "layers"]_minus1[i]) |  |
|   } |  |
|   for(h = 1; h < NumOutputLayerSets; h++) |  |
|     for(i = 0; i < NumPartitioningSchemes[h]; i++) { |  |
|       bsp_hrd_params [removed: "parameters"]_present_flag[h][i] | u(1) |
|       if(bsp_hrd_params [removed: "parameters"]_present_flag[h][i]) |  |
| { |  |
|         for(t = 0; t <= MaxSubLayersInLayerSetMinus1[OlsIdxToLsIdx[i] ]; t++) { |  |
|           num_bsp_schedules [removed: "sched_combinations"]_minus1[h][i][t] | ue(v) |
|           for(j = 0; j <= num_bsp_schedules [removed: "sched_combinations"]_minus1[h][i][t]; j++) |  |
|             for(k = 0; k <= num_partitions_in_scheme_minus1[h][i]; k++) { |  |
|               bsp[removed: "_comb"]_hrd_idx[h][i][t][j][k] | u(v) |
|               bsp[removed: "_comb"]_sched_idx[h][i][t][j][k] | ue(v) |
|             } |  |
|       } [removed: "}"] |  |
|     } |  |
|   } |  |
| } |  |

Example semantics for the syntax elements of Table 1 are described below. Unchanged syntax elements that are not otherwise discussed below may retain the semantics as described in the variant 2 attachment to JCTVC-R0010v2. Again, italicized text represents additions, while [removed: " "] represents deletions.

vps_num_add_hrd_params [removed: "parameters"] specifies the number of additional hrd_parameters( ) syntax structures present in the VPS. The value of vps_num_add_hrd_params [removed: "parameters"] shall be in the range of 0 to 1024—vps_num_hrd_parameters, inclusive.

cprms_add_present_flag[i] equal to 1 specifies that the HRD parameters that are common for all sub-layers are present in the i-th hrd_parameters( ) syntax structure. cprms_add_present_flag[i] equal to 0 specifies that the HRD equal to t. The value of num_bsp_schedules_minus1[h][i][t] shall be in the range of 0 to 31, inclusive.

The variable [removed: "SchedCombCnt"] BspSchedCnt [h][i][t] is set equal to num_bsp_schedules [removed: "sched_combinations"]_minus1[h][i][t]+1.

bsp [removed: "_comb"]_hrd_idx[h][i][t][j][k] specifies the index of the hrd_parameters( ) syntax structure in the VPS for the j-th [removed: "combination of a"] delivery schedule [removed: "and hrd_parameters( )"] specified for the k-th bitstream partition of the i-th partitioning scheme for the h-th OLS when HighestTid is equal to t. The length of the bsp [removed: "_comb"]_hrd_idx[h][i][t][j][k] syntax element is Ceil(Log 2(vps_num_hrd_parameters+vps_num_add_hrd_params [removed: "parameters"])) bits. The value of bsp [removed: "_comb"]_hrd_idx[h][i][t][j][k]

shall be in the range of 0 to vps_num_hrd_parameters+ vps_num_add_hrd_params [removed: "parameters"]−1, inclusive.

bsp [removed: "_comb"]_sched_idx[h][i][t][j][k] specifies the index of the [removed: "a"] delivery schedule within the sub_layer_hrd_parameters(t) [removed: "hrd_parameters( )"] syntax structure of the hrd_parameters(t) syntax structure with the index bsp [removed: "_comb"]_hrd_idx [h][i][t][j][k], that is used [removed: "in"] as the j-th [removed: "combination of a"] delivery schedule [removed: "and hrd_parameters( )"] specified for the k-th bitstream partition of the i-th partitioning scheme for the h-th OLS when HighestTid is equal to t. The value of bsp [removed: "_comb"]_sched_idx[h][i][t][j][k] shall be in the range of 0 to cpb_cnt_minus1[t[removed: "HighestTid"] ], inclusive, where cpb_cnt_minus1[t [removed: "HighestTid"] ] is found in the sub_layer_hrd_parameters(t [removed: "HighestTid"]) syntax structure from the hrd_parameters( ) syntax structure corresponding to the index bsp [removed: "_comb"]_hrd_idx[h][i][t][j][k].

In accordance with HEVC, other conventional HRD parameters may also be signaled in the HRD parameters syntax structure, although not necessarily shown in Table 1 above. For example, the HRD parameters may include fixed_pic_rate_within_cvs_flag[i], for which HEVC defines semantics as:

fixed_pic_rate_within_cvs_flag[i] equal to 1 indicates that, when HighestTid is equal to i, the temporal distance between the HRD output times of consecutive pictures in output order is constrained as specified below. fixed_pic_rate_within_cvs_flag[i] equal to 0 indicates that this constraint may not apply.

The HRD parameters may also include an elemental_duration_in_tc_minus1[i] syntax element, for which HEVC defines semantics as:

elemental_duration_in_tc_minus1[i] plus 1 (when present) specifies, when HighestTid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

The HRD parameters may also include a low_delay_hrd_flag[i] syntax element, for which HEVC defines semantics as:

low_delay_hrd_flag[i] specifies the HRD operational mode, when HighestTid is equal to i, as specified in Annex C. When not present, the value of low_delay_hrd_flag[i] is inferred to be equal to 0.

In the example of Table 1, num_sub_layer_hrd_minus1[i] represents an example of a syntax element that indicates a number of sub-layers of a bitstream for which hypothetical reference decoder (HRD) parameters are coded. The number of sub-layers for which HRD parameters are coded may be less than or equal to a maximum number of sub-layers indicated by a video parameter set (VPS) of the bitstream. Thus, a video coder may code HRD parameters for the number of sub-layers as indicated by the value for the syntax element and then process the bitstream using the HRD parameters. For example, video encoder 20 and video decoder 30 may remove pictures from a decoded picture buffer according to the HRD parameters. Moreover, destination device 14 may display pictures removed from the decoded picture buffer using display device 32.

As also shown in the example of Table 1, a video coder may code a set of HRD parameters for each sub-layer included in a multi-layer bitstream. In Table 1, the loop indicated by "for(t=0; t<=MaxSubLayersInLayerSetMinus1[OlsIdxToLsIdx[i]]; t++)" represents a loop over the number of sub-layers included in a particular layer set, which is performed for each of the available output layer sets. Within this loop, indexes for HRD parameters (bsp_hrd_idx) are signaled. Thus, this is one example technique for coding a number of HRD parameters that is equal to the number of sub-layers of the bitstream. In particular, there is a one-to-one mapping between HRD parameters and the number of sub-layers for each bitstream partition (that is, each output layer set).

Furthermore, a video coder (such as video encoder 20 or video decoder 30) may be configured to code (encode or decode, respectively) information indicative of a bitstream partition initial arrival time according to the example data structure of Table 2 below. Table 2 represents an example of a bitstream partition initial arrival time SEI message, which is changed relative to the variant 2 attachment of JCTVC-R0010v2. Again, italicized text represents additions and [removed: " "] represents deletions.

TABLE 2

| | Descriptor |
|---|---|
| bsp_initial_arrival_time(payloadSize) { | |
| psIdx = sei_partitioning_scheme_idx | |
| if(NalHrdBpPresentFlag) | |
|   for(i = 0; i < | |
| [removed: "SchedCombCnt"] BspSchedCnt[sei_ols_idx][psIdx | |
| [removed: "sei_partitioning_scheme_idx"]] | |
| [maxTemporalId[0] ]; i++) | |
|     nal_initial_arrival_delay[i] | u(v) |
| if(VclHrdBpPresentFlag) [removed: "else"] | |
|   for(i = 0; i < [removed: "SchedCombCnt"] BspSchedCnt | |
| [sei_ols_idx][psIdx [removed: | |
| "sei_partitioning_scheme_idx"] ][maxTemporalId[0] ]; i++) | |
|     vcl_initial_arrival_delay[i] | u(v) |
| } | |

Example semantics for the syntax elements of Table 2 are described below. Unchanged syntax elements that are not otherwise discussed below may retain the semantics as described in the variant 2 attachment to JCTVC-R0010v2. Again, italicized text represents additions, while [removed: " "] represents deletions.

The bitstream partition initial arrival time SEI message specifies the initial arrival times to be used in the bitstream-partition-specific CPB operation.

When present, this SEI message shall be contained within a bitstream partition nesting SEI message that is contained in a scalable nesting SEI message, and the same bitstream partition nesting SEI message shall also contain a buffering period SEI message.

The following applies for bitstream partition nesting SEI message syntax and semantics:

The syntax element initial_cpb_removal_delay_length_minus1 and the variables NalHrdBpPresentFlag and VclHrdBpPresentFlag are found in or derived from syntax elements found in the hrd_parameters( ) syntax structure that is applicable to at least one of the operation points to which the bitstream partition nesting SEI message applies.

[removed: Let hrdParamIdx[i] for i in the range of 0 to SchedCombCnt[sei_ols_idx][sei_partitioning_scheme_idx], inclusive, be equal to the value of bsp_comb_hrd_idx [olsIdx] [partitioningSchemeIdx][i][bspIdx], where olsIdx, partitioningSchemeIdx, and bspIdx are equal to sei_ols_idx, sei_partitioning_scheme_idx, and bsp_idx, respectively, of the bitstream partition nesting SEI message containing this bitstream partition initial arrival time SEI message. Let initialCpbRemovalDelayLength[i] be equal to initial_cpb_removal_delay_length_minus1+1, where initial_cpb_removal_delay_length_minus1 is found in the hrdParamIdx [i]-th hrd_parameters( ) syntax structure in the active VPS.]

nal_initial_arrival_delay[i] specifies the initial arrival time for the i-th delivery schedule [removed: "combination"] of the bitstream partition to which this SEI message applies, when NAL HRD parameters are in use. The length, in bits, of the nal_initial_arrival_delay[i] syntax element is equal to initial_cpb_removal_delay_length_minus1+1 [removed: "initialCpbRemovalDelayLength[i]"].

vcl_initial_arrival_delay[i] specifies the initial arrival time for the i-th delivery schedule [removed: "combination"] of the bitstream partition to which this SEI message applies, when VCL HRD parameters are in use. The length, in bits, of the vcl_initial_arrival_delay[i] syntax element is equal to initial_cpb_removal_delay_length_minus1+1 [removed: "initialCpbRemovalDelayLength[i]"].

Additional examples of these techniques are discussed below, e.g., with respect to Tables 3 and 4. Table 3 represents an alternative to the example of Table 1, while Table 4 represents an alternative to the example of Table 4. Again, differences are shown relative to the variant 2 attachment of JCTVC-R0010v2, where italicized text represents additions and [removed: " "] represents deletions.

parameters that are common for all sub-layers are not present in the i-th hrd_parameters( ) syntax structure and are derived to be the same as the (i−1)-th hrd_parameters( ) syntax structure.

num_sub_layer_hrd_minus1[i] plus 1 specifies the number of fixed_pic_rate_general_flag[ ] syntax elements in the i-th hrd_parameters( ) syntax structure. The value of num_sub_layer_hrd_minus1[i] shall be in the range of 0 to vps_max_sub_layers_minus1, inclusive.

bsp_hrd_params [removed: "parameters"]_present_flag [h][i] equal to 1 specifies that the HRD parameters are present for all bitstream parathions of the i-th partitioning schemes of the h-th OLS. bsp_hrd_params [removed: "parameters"]_present_flag[h][i] equal to 0 specifies that the HRD parameters are not present for any bitstream partitition of the i-th partitioning scheme of the h-th OLS.

[removed: "num_bsp_sched_combinations_minus1[h][i] plus 1 specifies the number of combinations of delivery schedules and hrd_parameters( ) specified for bitstream partitions of the i-th partitioning scheme of the h-th OLS. [Ed. (MH): Add the allowed value range for this syntax element.]"]

[removed: "The variable SchedCombCnt[h][i] is set equal to num_bsp_sched_combinations_minus1[h][i]+1."]

TABLE 3

|  | Descriptor |
|---|---|
| vps_vui_bsp_hrd_params [removed: "parameters"] ( ) { |  |
|   vps_num_add_hrd_params [removed: "parameters"] | ue(v) |
|   for( i = vps_num_hrd_parameters; i < vps_num_hrd_parameters + vps_num_add_hrd_params [removed: "parameters"]; i++ ) { |  |
|     if( i > 0 ) { |  |
|       cprms_add_present_flag[i] | u(1) |
|       num_sub_layer_hrd_minus1[i] | ue(v) |
|     } |  |
|     hrd_parameters(cprms_add_present_flag[i], num [removed: "vps_max"]_sub_hrd [removed: "layers"]_minus1[i]) |  |
|   } |  |
|   for(h = 1; h < NumOutputLayerSets; h++) |  |
|     for(i = 0; i < NumPartitioningSchemes[h]; i++) { |  |
|       bsp_hrd_params [removed: "parameters"]_present_flag[h][i] | u(1) |
|       if(bsp_hrd_params [removed: "parameters"]_present_flag[h][i] )[removed: "{"] |  |
|         [removed: "num_bsp_sched_combinations_minus1[h][i]"] | [removed: "ue(v)"] |
|         [removed: "for(j = 0; j <= num_bsp_schedules_combinations_minus1[h][i][t]; j++ )"] |  |
|         for(k = 0; k <= num_partitions_in_scheme_minus1[h][i]; k++)[removed: "}"] |  |
|           bsp[removed: "_comb"]_hrd_idx[h][i][removed: "[j]"][k] | u(v) |
|           [removed: "bsp_comb_sched_idx[h][i][j][k]"] | [removed: "ue(v)"] |
|       [removed: "}"] |  |
|     } |  |
| } |  |

Example semantics for the syntax elements of Table 3 are described below. Unchanged syntax elements that are not otherwise discussed below may retain the semantics as described in the variant 2 attachment to JCTVC-R0010v2. Again, italicized text represents additions, while [removed: " "] represents deletions.

vps_num_add_hrd_params [removed: "parameters"] specifies the number of additional hrd_parameters( ) syntax structures present in the VPS. The value of vps_num_add_hrd_params [removed: "parameters"] shall be in the range of 0 to 1024—vps_num_hrd_parameters, inclusive.

cprms_add_present_flag[i] equal to 1 specifies that the HRD parameters that are common for all sub-layers are present in the i-th hrd_parameters( ) syntax structure. cprms_add_present_flag[i] equal to 0 specifies that the HRD bsp [removed: "_comb"]_hrd_idx[h][i][removed: "[j]"][k] specifies the index of the hrd_parameters( ) syntax structure in the VPS for the [removed: "j-th combination of a delivery schedule and hrd_parameters( ) specified for the"] k-th bitstream partition of the i-th partitioning scheme for the h-th OLS [removed: " "]. The length of the bsp [removed: "_comb"]_hrd_idx[h][i][removed: "[j]"][k] syntax element is Ceil(Log 2(vps_num_hrd_parameters+vps_num_add_hrd_params [removed: "parameters"])) bits. The value of bsp [removed: "_comb"]_hrd_idx[h][i][removed: "[j]"][k] shall be in the range of 0 to vps_num_hrd_parameters+vps_num_add_hrd_params [removed: "parameters"]−1, inclusive.

[removed: "bsp_comb_sched_idx[h][i][j][k] specifies the index of a delivery schedule within the hrd_parameters( )

syntax structure with the index bsp_comb_hrd_idx[h][i][j][k] that is used in the j-th combination of a delivery schedule and hrd_parameters( ) specified for the k-th bitstream partition of the i-th partitioning scheme for the h-th OLS. The value of bsp_comb_sched_idx[h][i][j][k] shall be in the range of 0 to cpb_cnt_minus1[HighestTid], inclusive, where cpb_cnt_minus1[HighestTid] is found in the sub_layer_hrd_parameters(HighestTid) syntax structure from the hrd_parameters( ) syntax structure corresponding to the index bsp_comb_hrd_idx[h][i][j][k]. [Ed. (YK): Both forms of "sub_layer_hrd_parameters(HighestTid)" and "sub_layer_hrd_parameters( ) are used in the document for referencing of the syntax structure. Check whether it would be better to consistently use just one of them.]"]

HEVC specifies the following semantics for the fixed_pic_rate_general_flag[i]: fixed_pic_rate_general_flag[i] equal to 1 indicates that, when HighestTid is equal to i, the temporal distance between the HRD output times of consecutive pictures in output order is constrained as specified below. fixed_pic_rate_general_flag[i] equal to 0 indicates that this constraint may not apply.

In the example of Table 3, num_sub_layer_hrd_minus1[i] represents an example of a syntax element that indicates a number of sub-layers of a bitstream for which hypothetical reference decoder (HRD) parameters are coded. The number of sub-layers for which HRD parameters are coded may be less than or equal to a maximum number of sub-layers indicated by a video parameter set (VPS) of the bitstream. Thus, a video coder may code HRD parameters for the number of sub-layers as indicated by the value for the syntax element and then process the bitstream using the HRD parameters. For example, video encoder 20 and video decoder 30 may remove pictures from a decoded picture buffer according to the HRD parameters. Moreover, destination device 14 may display pictures removed from the decoded picture buffer using display device 32.

Table 3 also represents another example technique by which a video coder may code a set of HRD parameters for each sub-layer included in a multi-layer bitstream. Contrasted with the techniques shown in Table 1, the example of Table 3 includes simply signaling an index to the list of hrd_parameters( ) syntax structure for a set of sub-layers included in a bitstream partition.

TABLE 4

| | Descriptor |
|---|---|
| bsp_initial_arrival_time(payloadSize) { | |
| if(NalHrdBpPresentFlag) | |
|   for(i = 0; i <= CpbCnt [removed: "SchedCombCnt[sei_ols_idx][sei_partitioning_scheme_idx]"]; i++) | |
|     nal_initial_arrival_delay[i] | u(v) |
| if(VclHrdBpPresentFlag)[removed: "else"] | |
|   for(i = 0; i <= CpbCnt [removed: "SchedCombCnt[sei_ols_idx][sei_partitioning_scheme_idx]"]; i++) | |
|     vcl_initial_arrival_delay[i] | u(v) |
| } | |

Example semantics for the syntax elements of Table 4 are described below. Unchanged syntax elements that are not otherwise discussed below may retain the semantics as described in the variant 2 attachment to JCTVC-R0010v2. Again, italicized text represents additions, while [removed: " "] represents deletions.

The bitstream partition initial arrival time SEI message specifies the initial arrival times to be used in the bitstream-partition-specific CPB operation.

When present, this SEI message shall be contained within a bitstream partition nesting SEI message that is contained in a scalable nesting SEI message, and the same bitstream partition nesting SEI message shall also contain a buffering period SEI message.

The following applies for bitstream partition nesting SEI message syntax and semantics:

The syntax element initial_cpb_removal_delay_length_minus1 and the variables NalHrdBpPresentFlag and VclHrdBpPresentFlag are found in or derived from syntax elements found in the hrd_parameters( ) syntax structure that is applicable to at least one of the operation points to which the bitstream partition nesting SEI message applies.

[removed: Let hrdParamIdx[i] for i in the range of 0 to SchedCombCnt[sei_ols_idx][sei_partitioning_scheme_idx], inclusive, be equal to the value of bsp_comb_hrd_idx[olsIdx] [partitioningSchemeIdx][i][bspIdx], where olsIdx, partitioningSchemeIdx, and bspIdx are equal to sei_ols_idx, sei_partitioning_scheme_idx, and bsp_idx, respectively, of the bitstream partition nesting SEI message containing this bitstream partition initial arrival time SEI message. Let initialCpbRemovalDelayLength[i] be equal to initial_cpb_removal_delay_length_minus1+1, where initial_cpb_removal_delay_length_minus1 is found in the hrdParamIdx[i]-th hrd_parameters( ) syntax structure in the active VPS.]

nal_initial_arrival_delay[i] specifies the initial arrival time for the i-th delivery schedule [removed: "combination"] of the bitstream partition to which this SEI message applies, when NAL HRD parameters are in use. The length, in bits, of the nal_initial_arrival_delay[i] syntax element is equal to initial_cpb_removal_delay_length_minus1+1 [removed: "initialCpbRemovalDelayLength[i]"].

vcl_initial_arrival_delay[i] specifies the initial arrival time for the i-th delivery schedule [removed: "combination"] of the bitstream partition to which this SEI message applies, when VCL HRD parameters are in use. The length, in bits, of the vcl_initial_arrival_delay[i] syntax element is equal to initial_cpb_removal_delay_length_minus1+1 [removed: "initialCpbRemovalDelayLength[i]"].

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
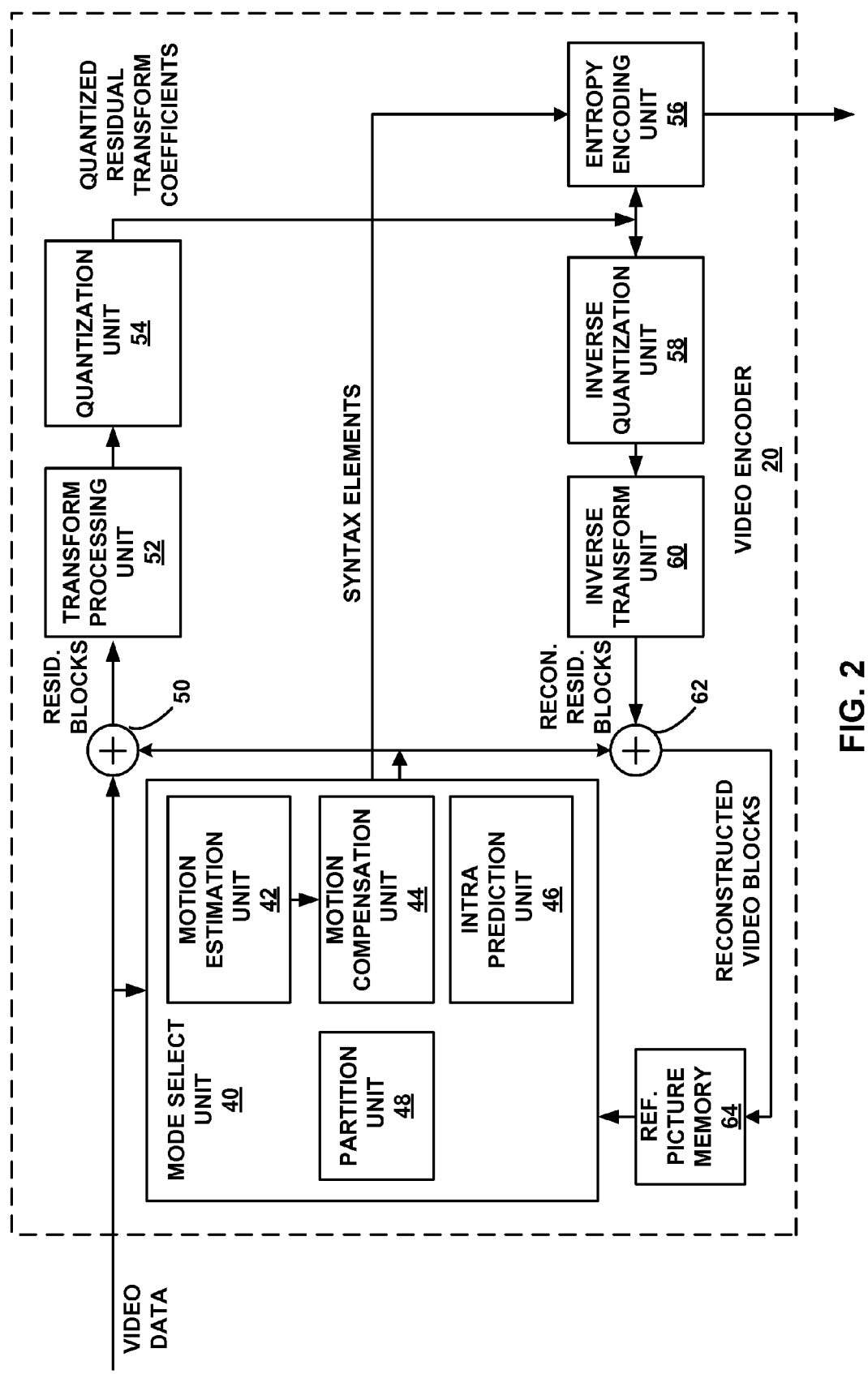
FIG. 2 is a block diagram illustrating an example of a video encoder that may implement techniques for improving hypothetical reference decoder (HRD) parameter signaling.

FIG. 2 is a block diagram illustrating an example of video encoder 20 that may implement techniques for improving hypothetical reference decoder (HRD) parameter signaling. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 scans and entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Video encoder 20 generally uses the process discussed above to encode each block of each picture in a coded video sequence. In addition, in some examples, video encoder 20 may determine temporal layers to which to assign each of the pictures. Furthermore, video encoder 20 may be configured to encode pictures of other layers, e.g., other views, scalable video coding layers, or the like. In any case, video encoder 20 may further encode data indicating a layer to which each picture belongs, for one or more layers (e.g., of various video dimensions).

In accordance with the techniques of this disclosure, video encoder 20 may also encode other data structures, such as parameter sets including, for example, video parameter sets (VPSs), sequence parameter sets (SPSs), picture parameter sets (PPSs), supplemental enhancement information (SEI) messages, or the like. In accordance with the techniques of this disclosure, video encoder 20 may encode a VPS including information described with respect to Tables 1 or 3 above, and/or an SEI message including information described with respect to Tables 2 or 4 above.

For example, video encoder 20 may encode a value for a syntax element that indicates a number of sub-layers of a bitstream for which hypothetical reference decoder (HRD) parameters (e.g., included in a VPS) are encoded. In accordance with the techniques of this disclosure, video encoder 20 may encode HRD parameters for each sub-layer of a partition of a bitstream, but avoid coding more HRD parameters than sub-layers of the partition. Thus, the number of HRD parameter data structures for the partition may be less than the maximum number of sub-layers, as indicated in the VPS. Furthermore, video encoder 20 may process data of the bitstream using the HRD parameters. For example, video encoder 20 may discard decoded pictures from reference picture memory 64 according to data signaled in the HRD parameters.

As another example, which may be in addition to or in the alternative to the examples discussed above, video encoder 20 may encode a syntax element representative of an initial arrival delay for video coding layer HRD parameters if and only if a VclHrdBpPresentFlag is equal to 1 (i.e., has a value of true). According to H.265, the value for VclHrdBpPresentFlag is set as follows:

If one or more of the following conditions are true, the value of VclHrdBpPresentFlag is set equal to 1:
vcl_hrd_parameters_present_flag is present in the bitstream and is equal to 1.
The need for presence of buffering periods for VCL HRD operation to be present in the bitstream in buffering period SEI messages is determined by the application, by some means not specified in this Specification.
Otherwise, the value of VclHrdBpPresentFlag is set equal to 0.

Thus, in accordance with the techniques of this disclosure, video encoder 20 may encode a syntax element representative of an initial arrival delay for video coding layer HRD parameters if and only if at least one of video coding layer (VCL) HRD parameters are coded in the bitstream or when buffering period information for VCL HRD operations are determined to be needed in the bitstream.

In this manner, video encoder 20 of FIG. 2 represents an example of a video encoder configured to encode a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, encode HRD parameters for the number of sub-layers as indicated by the value for the syntax element, and process the bitstream using the HRD parameters.

Moreover, video encoder 20 represents an example of a video encoder configured to encode an initial arrival delay syntax element of a bitstream partition initial arrival time supplemental enhancement information (SEI) message only when at least one of video coding layer (VCL) HRD parameters are coded in the bitstream or when buffering period information for VCL HRD operations are determined to be needed in the bitstream. That is, video encoder 20 represents an example of a video encoder configured to encode an initial arrival delay syntax element of a bitstream partition initial arrival time supplemental enhancement information (SEI) message only when a VclHrdBpPresentFlag has a value of true.

Figure 3:
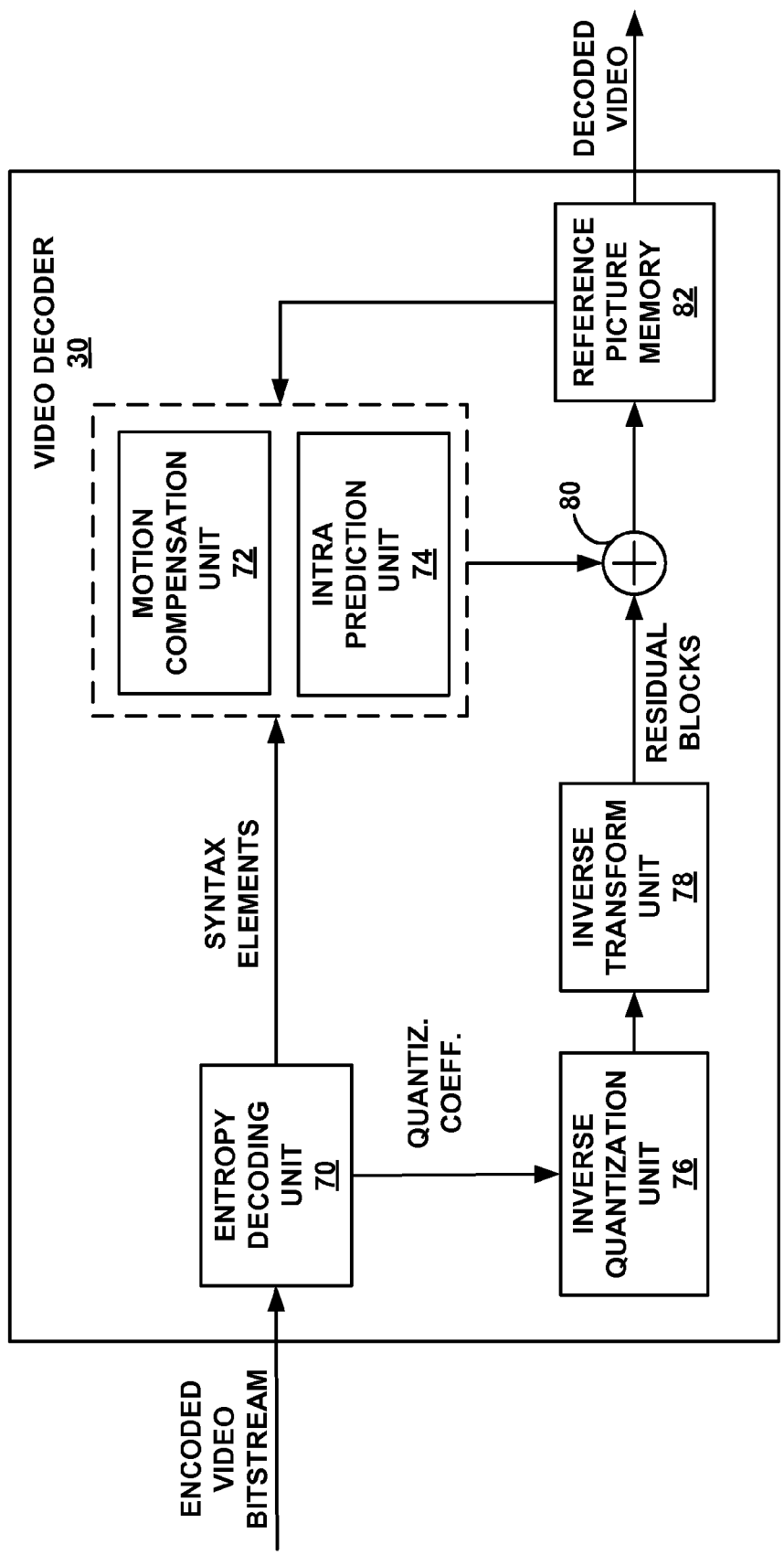
FIG. 3 is a block diagram illustrating an example of a video decoder that may implement techniques for improving hypothetical reference decoder (HRD) parameter signaling.

FIG. 3 is a block diagram illustrating an example of video decoder 30 that may implement techniques for improving hypothetical reference decoder (HRD) parameter signaling. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 generally uses the process discussed above to decode each block of each picture in a coded video sequence. In addition, in some examples, video decoder 30 may decode data indicating temporal layers to which pictures are assigned. Furthermore, video decoder 30 may be configured to decode pictures of other layers, e.g., other views, scalable video coding layers, or the like. In any case, video decoder 30 may further decode data indicating a layer to which each picture belongs, for one or more layers (e.g., of various video dimensions).

In accordance with the techniques of this disclosure, video decoder 30 may also decode other data structures, such as parameter sets including, for example, video parameter sets (VPSs), sequence parameter sets (SPSs), picture parameter sets (PPSs), supplemental enhancement information (SEI) messages, or the like. In accordance with the techniques of this disclosure, video decoder 30 may decode a VPS including information described with respect to Tables 1 or 3 above, and/or an SEI message including information described with respect to Tables 2 or 4 above.

For example, video decoder 30 may decode a value for a syntax element that indicates a number of sub-layers of a bitstream for which hypothetical reference decoder (HRD) parameters (e.g., included in a VPS) are decoded. In accordance with the techniques of this disclosure, video decoder 30 may decode HRD parameters for each sub-layer of a partition of a bitstream, but avoid coding more HRD parameters than sub-layers of the partition. Thus, the number of HRD parameter data structures for the partition may be less than the maximum number of sub-layers, as indicated in the VPS. Furthermore, video decoder 30 may process data of the bitstream using the HRD parameters. For example, video decoder 30 may output and/or discard decoded pictures from reference picture memory 82 according to data signaled in the HRD parameters. In particular, video decoder 30 may output decoded pictures to a video display, such as display device 32, to cause the video display to present the decoded pictures.

As another example, which may be in addition to or in the alternative to the examples discussed above, video decoder 30 may decode a syntax element representative of an initial arrival delay for video coding layer HRD parameters if and only if a VclHrdBpPresentFlag is equal to 1 (i.e., has a value of true). According to H.265, the value for VclHrdBpPresentFlag is set as follows:
If one or more of the following conditions are true, the value of VclHrdBpPresentFlag is set equal to 1:
vcl_hrd_parameters_present_flag is present in the bitstream and is equal to 1.
The need for presence of buffering periods for VCL HRD operation to be present in the bitstream in buffering period SEI messages is determined by the application, by some means not specified in this Specification.
Otherwise, the value of VclHrdBpPresentFlag is set equal to 0.

Thus, in accordance with the techniques of this disclosure, video decoder 30 may decode a syntax element representative of an initial arrival delay for video coding layer HRD parameters if and only if at least one of video coding layer (VCL) HRD parameters are coded in the bitstream or when buffering period information for VCL HRD operations are determined to be needed in the bitstream.

In this manner, video decoder 30 of FIG. 3 represents an example of a video decoder configured to decode a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, decode HRD parameters for the number of sub-layers as indicated by the value for the syntax element, and process the bitstream using the HRD parameters.

Moreover, video decoder 30 represents an example of a video decoder configured to decode an initial arrival delay syntax element of a bitstream partition initial arrival time supplemental enhancement information (SEI) message only when at least one of video coding layer (VCL) HRD parameters are coded in the bitstream or when buffering period information for VCL HRD operations are determined to be needed in the bitstream. That is, video decoder 30 represents an example of a video decoder configured to decode an initial arrival delay syntax element of a bitstream partition initial arrival time supplemental enhancement information (SEI) message only when a VclHrdBpPresentFlag has a value of true. Video decoder 30 may determine whether bits of the bitstream correspond to the bitstream partition initial arrival time SEI message, or a different data structure, based on these techniques, and thereby correctly parse the bitstream.

Figure 4:
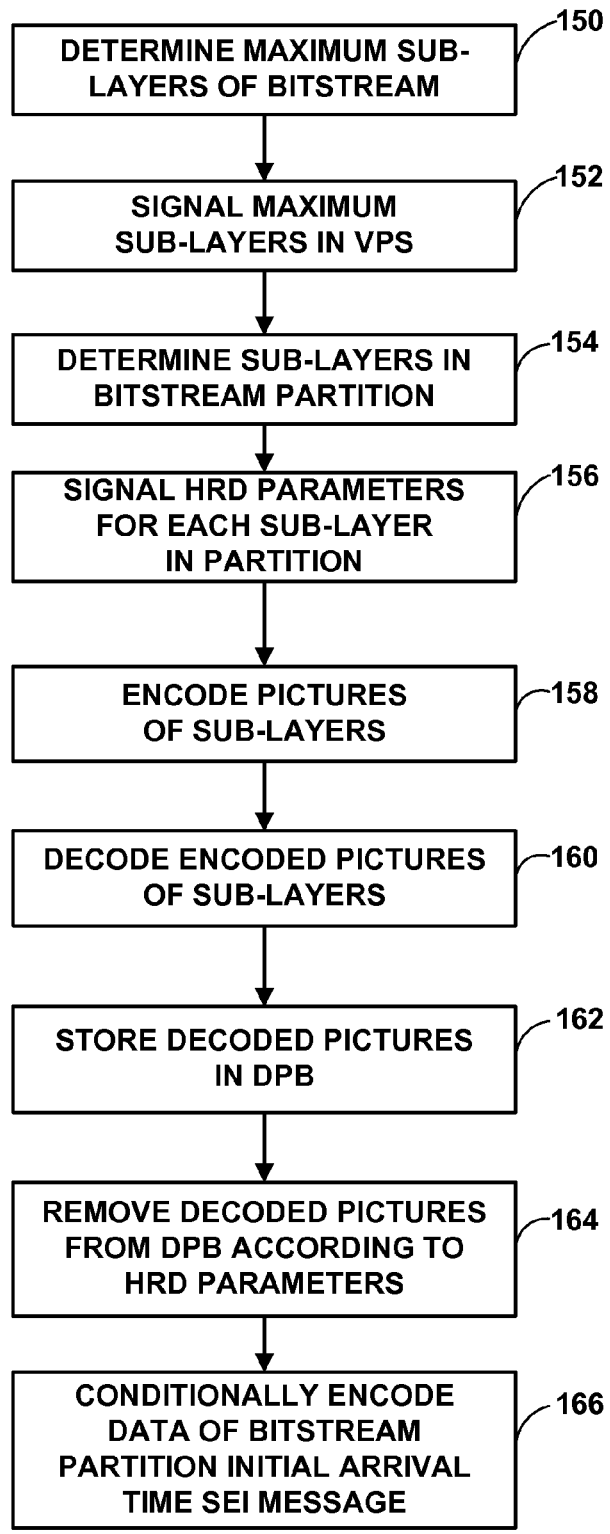
FIG. 4 is a flowchart illustrating an example method for encoding video data according to the techniques of this disclosure.

FIG. 4 is a flowchart illustrating an example method for encoding video data according to the techniques of this disclosure. Although described with respect to video encoder 20 (FIGS. 1 and 2), it should be understood that other devices may be configured to perform a method similar to that of FIG. 4.

In this example, video encoder 20 initially determines a maximum number of sub-layers of a bitstream (150). Video encoder 20 also signals the maximum number of sub-layers in a video parameter set (VPS) (152) for the bitstream. The bitstream is ultimately partitioned into various partitions, each of which includes a particular subset of the sub-layers. Thus, certain partitions will include fewer than the maximum number of sub-layers.

Video encoder 20 may then determine sub-layers in a bitstream partition (154). Video encoder 20 may then signal HRD parameters for each sub-layer in the partition (156). For instance, as shown in Tables 1 and 3, video encoder 20 may encode values for bsp_hrd_idx syntax elements. In particular, in Table 1, video encoder 20 may encode values for bsp_hrd_idx[h][i][t][j][k], while in Table 3, video encoder 20 may encode values for bsp_hrd_idx[h][i][j][k]. In Table 1, these values occur within nested loops over the number of output layer sets, partitioning schemes, and sub-layers in the layer set, whereas in Table 3, these values occur within nested loops over the number of output layer sets and partitioning schemes.

Video encoder 20 also encodes pictures of the sub-layers (158), decodes the encoded pictures of the sub-layers (160), and stores the decoded pictures in a decoded picture buffer (DPB) (162), such as reference picture memory 64 (FIG. 2). Video encoder 20 stores decoded versions of the encoded pictures for subsequent use as reference pictures, such that subsequent prediction from these versions of the reference pictures will be the same as versions ultimate decoded by a decoder, such as video decoder 30. Furthermore, video encoder 20 removes decoded pictures from the DPB according to the HRD parameters (164).

Moreover, in accordance with certain techniques of this disclosure, video encoder 20 may conditionally encode data of a bitstream partition initial arrival time SEI message (166). In particular, video encoder 20 may encode an initial arrival delay syntax element of the bitstream partition initial arrival time SEI message only after determining that a VclHrdBpPresentFlag has a value of true (i.e., 1), e.g., if and only if at least one of video coding layer (VCL) HRD parameters are coded in the bitstream or when buffering period information for VCL HRD operations are determined to be needed in the bitstream.

In this manner, the method of FIG. 4 represents an example of a method including coding (encoding, in this example) a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, coding (encoding, in this example) HRD parameters for the number of sub-layers as indicated by the value for the syntax element, and processing the bitstream using the HRD parameters.

Figure 5:
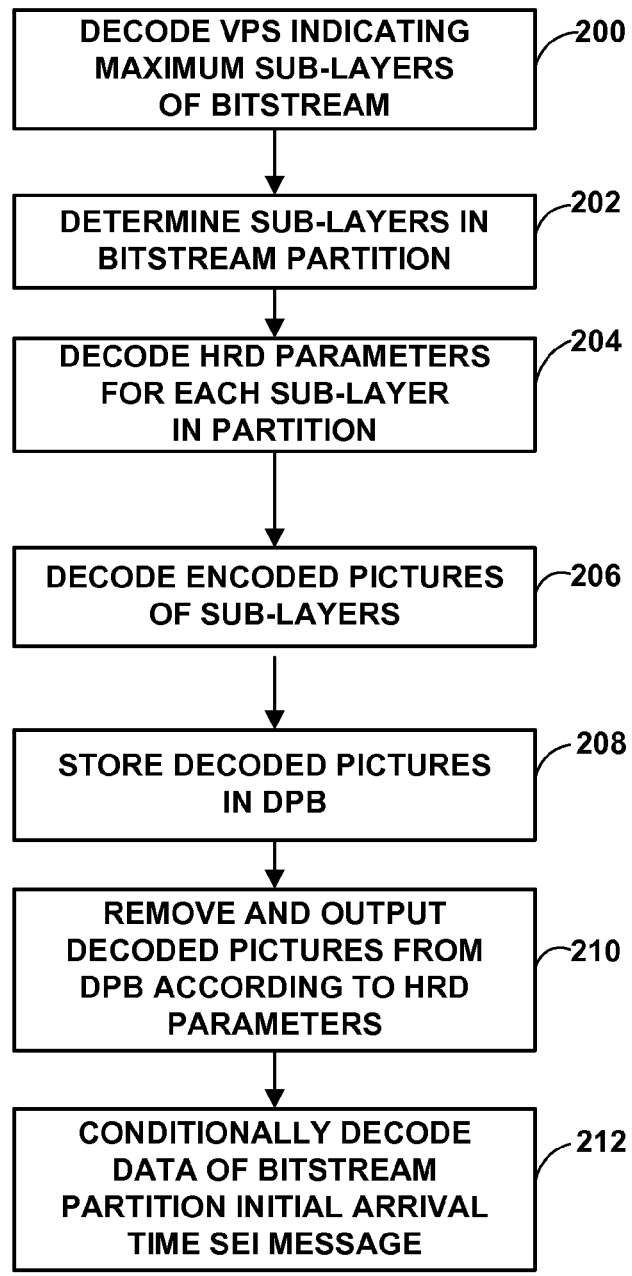
FIG. 5 is a flowchart illustrating an example method for decoding video data according to the techniques of this disclosure.

FIG. 5 is a flowchart illustrating an example method for decoding video data according to the techniques of this disclosure. Although described with respect to video decoder 30 (FIGS. 1 and 3), it should be understood that other devices may be configured to perform a method similar to that of FIG. 5.

In this example, video decoder 30 initially decodes a video parameter set (VPS) indicating a maximum number of sub-layers of a bitstream (200). The bitstream is ultimately partitioned into various partitions, each of which includes a particular subset of the sub-layers. Thus, certain partitions include fewer than the maximum number of sub-layers.

Video decoder 30 may then determine sub-layers in a bitstream partition (202). Video decoder 30 may then decode HRD parameters for each sub-layer in the partition (204). For instance, as shown in Tables 1 and 3, video decoder 30 may decode values for bsp_hrd_idx syntax elements. In particular, in Table 1, video decoder 30 may decode values for bsp_hrd_idx[h][i][t][j][k], while in Table 3, video decoder 30 may decode values for bsp_hrd_idx[h][i][j][k]. In Table 1, these values occur within nested loops over the number of output layer sets, partitioning schemes, and sub-layers in the layer set, whereas in Table 3, these values occur within nested loops over the number of output layer sets and partitioning schemes.

Video decoder 30 also decodes encoded pictures of the sub-layers (206) and stores the decoded pictures in a decoded picture buffer (DPB) (208), such as reference picture memory 82 (FIG. 3). Video decoder 30 stores the decoded pictures for subsequent use as reference pictures, such that subsequent prediction from these versions of the reference pictures is the same as versions ultimate decoded by a decoder, such as video decoder 30. Moreover, video decoder 30 stores the decoded pictures such that video decoder 30 can output the decoded pictures an appropriate time. Thus, video decoder 30 removes and outputs decoded pictures from the DPB according to the HRD parameters (210).

Moreover, in accordance with certain techniques of this disclosure, video decoder 30 may conditionally decode data of a bitstream partition initial arrival time SEI message (212). In particular, video decoder 30 may decode an initial arrival delay syntax element of the bitstream partition initial arrival time SEI message only after determining that a VclHrdBpPresentFlag has a value of true (i.e., 1), e.g., if and only if at least one of video coding layer (VCL) HRD parameters are coded in the bitstream or when buffering period information for VCL HRD operations are determined to be needed in the bitstream. That is, a parser (not shown) associated with video decoder 30 may interpret certain bits of the bitstream as either belonging to the syntax element of the bitstream partition initial arrival time SEI message, or a separate syntax element. In other words, the parser may differentiate between bits of the bitstream that correspond to the HRD parameters and bits of the bitstream that correspond to syntax elements following the HRD parameters.

In this manner, the method of FIG. 5 represents an example of a method including coding (decoding, in this example) a value for a syntax element that indicates a number of sub-layers of a bitstream for which hypothetical reference decoder (HRD) parameters are coded, wherein the value indicates that the number of sub-layers for which HRD parameters are coded is less than a maximum number of sub-layers indicated by a video parameter set (VPS) of the bitstream, coding (decoding, in this example) HRD parameters for the number of sub-layers as indicated by the value for the syntax element, and processing the bitstream using the HRD parameters.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    coding, by a processor, hypothetical reference decoder (HRD) parameters for each sub-layer of each bitstream partition of a video bitstream including the video data, wherein coding the HRD parameters comprises:
        coding a first BIRD parameters syntax structure for a first sub-layer of a bitstream partition; and
        coding a second HRD parameters syntax structure for a second sub-layer of the bitstream partition, wherein the first BIRD parameters syntax structure is different than the second BIRD parameters syntax structure, and wherein the first sub-layer is different than the second sub-layer; and
    processing, by the processor, the video bitstream using the HRD parameters, wherein processing the video bitstream comprises coding one or more pictures of the first sub-layer of the bitstream partition using the HRD parameters and coding one or more pictures of the second sub-layer of the bitstream partition using the HRD parameters.

2. The method of claim 1, wherein coding the HRD parameters comprises:
    coding a number representative of a number of iterations of a loop of the HRD parameters, each of the iterations of the loop corresponding to one of the sub-layers; and
    coding the HRD parameters for each of the sub-layers in a corresponding one of the loop iterations.

3. The method of claim 1, wherein coding the HRD parameters comprises:
    coding a plurality of sets of HRD parameters; and
    coding indexes for each of the sub-layers such that the index for each sub-layer represents one of the sets of HRD parameters that corresponds to the sub-layer.

4. The method of claim 1, wherein the sub-layers comprise temporal sub-layers, and wherein coding the HRD parameters comprises coding a number, equal to the number of temporal sub-layers for which the HRD parameters are coded, of syntax elements indicative of at least whether temporal distances between HRD output times of consecutive pictures in output order are constrained for a temporal sub-layer of the bitstream.

5. The method of claim 4, wherein the syntax elements indicative of at least whether the temporal distances between HRD output times of consecutive pictures in output order are constrained comprise at least one of fixed_pic_rate_general_flag[ ] syntax elements or fixed_pic_rate_within_CVS_flag[ ] syntax elements.

6. The method of claim 1, wherein coding the HRD parameters comprises coding syntax elements indicative of temporal distance, in clock ticks, between elemental units that specify HRD output times of consecutive pictures for the corresponding sub-layers.

7. The method of claim 1, wherein coding the HRD parameters comprises coding syntax elements indicative of an HRD operational mode of the corresponding sub-layers.

8. The method of claim 1, wherein coding the HRD parameters comprises one of decoding the HRD parameters or encoding the HRD parameters.

9. The method of claim 1, the method being executable on a wireless communication device, wherein the device comprises:
    a memory configured to store the HRD parameters;
    the processor, the processor being configured to execute instructions to process the HRD parameters stored in the memory and the video bitstream; and
    a receiver for receiving a signal including the video bitstream and the HRD parameters and for storing the HRD parameters to the memory.

10. The method of claim 9, wherein the wireless communication device is a cellular telephone and the signal is received by the receiver and modulated according to a cellular communication standard.

11. A device for coding video data, the device comprising:
    a memory configured to store video data; and
    a video coder configured to:
        code hypothetical reference decoder (HRD) parameters for each sub-layer of each bitstream partition of a video bitstream including the video data, wherein, to code the HRD parameters, the video coder is configured to:
            code a first HRD parameters syntax structure for a first sub-layer of a bitstream partition; and
            code a second HRD parameters syntax structure for a second sub-layer of the bitstream partition, wherein the first BIRD parameters syntax structure is different than the second BIRD parameters syntax structure, and wherein the first sub-layer is different than the second sub-layer; and
        process the video bitstream using the BIRD parameters, wherein, to process the video bitstream, the video coder is configured to code one or more pictures of the first sub-layer of the bitstream partition using the HRD parameters and code one or more pictures of the second sub-layer of the bitstream partition using the HRD parameters.

12. The device of claim 11, wherein to code the BIRD parameters, the video coder is configured to:
    code a number representative of a number of iterations of a loop of the HRD parameters, each of the iterations of the loop corresponding to one of the sub-layers; and
    code the HRD parameters for each of the sub-layers in a corresponding one of the loop iterations.

13. The device of claim 11, wherein to code the BIRD parameters, the video coder is configured to:
    code a plurality of sets of BIRD parameters; and
    code indexes for each of the sub-layers such that the index for each sub-layer represents one of the sets of BIRD parameters that corresponds to the sub-layer.

14. The device of claim 11, wherein the sub-layers comprise temporal sub-layers, and wherein to code the BIRD parameters, the video coder is configured to code a number, equal to the number of temporal sub-layers for which BIRD parameters are coded, of syntax elements indicative of at least whether temporal distances between BIRD output times of consecutive pictures in output order are constrained for a temporal sub-layer of the bitstream.

15. The device of claim 14, wherein the syntax elements indicative of at least whether the temporal distances between BIRD output times of consecutive pictures in output order are constrained comprise at least one of fixed_pic_rate_general_flag[ ] syntax elements or fixed_pic_rate_within_CVS_flag[ ] syntax elements.

16. The device of claim 11, wherein to code the BIRD parameters, the video coder is configured to code syntax elements indicative of temporal distance, in clock ticks, between elemental units that specify BIRD output times of consecutive pictures for the corresponding sub-layers.

17. The device of claim 11, wherein coding the BIRD parameters comprises coding syntax elements indicative of an BIRD operational mode of the corresponding sub-layers.

18. The device of claim 11, wherein the video coder comprises one of a video decoder or a video encoder.

19. The device of claim 11, wherein the device is a wireless communication device, further comprising a receiver configured to receive a signal including the video bitstream and the BIRD parameters and to store the BIRD parameters to the memory.

20. The device of claim 19, wherein the wireless communication device is a cellular telephone and the signal is received by the receiver and modulated according to a cellular communication standard.

21. A device for coding video data, the device comprising:
means for coding hypothetical reference decoder (HRD) parameters for each sub-layer of each bitstream partition of a video bitstream including the video data, wherein the means for coding the BIRD parameters comprises:
means for coding a first HRD parameters syntax structure for a first sub-layer of a bitstream partition; and
means for coding a second HRD parameters syntax structure for a second sub-layer of the bitstream partition, wherein the first HRD parameters syntax structure is different than the second HRD parameters syntax structure, and wherein the first sub-layer is different than the second sub-layer; and
means for processing the video bitstream using the HRD parameters, wherein the means for processing the video bitstream comprises means for coding one or more pictures of the first sub-layer of the bitstream partition using the HRD parameters and means for coding one or more pictures of the second sub-layer of the bitstream partition using the HRD parameters.

22. The device of claim 21, wherein the means for coding the HRD parameters comprises:
means for coding a number representative of a number of iterations of a loop of the HRD parameters, each of the iterations of the loop corresponding to one of the sub-layers; and
means for coding the HRD parameters for each of the sub-layers in a corresponding one of the loop iterations.

23. The device of claim 21, wherein the means for coding the HRD parameters comprises:
means for coding a plurality of sets of HRD parameters; and
means for coding indexes for each of the sub-layers such that the index for each sub-layer represents one of the sets of BIRD parameters that corresponds to the sub-layer.

24. The device of claim 21, wherein the sub-layers comprise temporal sub-layers, and wherein the means for coding the HRD parameters comprises means for coding a number, equal to the number of temporal sub-layers for which HRD parameters are coded, of syntax elements indicative of at least whether temporal distances between BIRD output times of consecutive pictures in output order are constrained for a temporal sub-layer of the bitstream.

25. The device of claim 21, wherein the means for coding the HRD parameters comprises means for coding syntax elements indicative of temporal distance, in clock ticks, between elemental units that specify BIRD output times of consecutive pictures for the corresponding sub-layers.

26. The device of claim 21, wherein the means for coding the HRD parameters comprises means for coding syntax elements indicative of an HRD operational mode of the corresponding sub-layers.

27. The device of claim 21, wherein the means for coding the HRD parameters comprises one of means for decoding the HRD parameters or means for encoding the HRD parameters.

28. A non-transitory computer-readable storage medium having stored thereon instructions that, when executed, cause a processor to:
code hypothetical reference decoder (HRD) parameters for each sub-layer of each bitstream partition of a video bitstream including the video data, wherein the instructions that cause the processor to code the BIRD parameters comprise instructions that cause the processor to:
code a first BIRD parameters syntax structure for a first sub-layer of a bitstream partition; and
code a second BIRD parameters syntax structure for a second sub-layer of the bitstream partition, wherein the first BIRD parameters syntax structure is different than the second BIRD parameters syntax structure, and wherein the first sub-layer is different than the second sub-layer; and
process the video bitstream using the HRD parameters, wherein the instructions that cause the processor to process the video bitstream comprise instructions that cause the processor to code one or more pictures of the first sub-layer of the bitstream partition using the HRD parameters and code one or more pictures of the second sub-layer of the bitstream partition using the HRD parameters.

29. The non-transitory computer-readable storage medium of claim 28, wherein the instructions that cause the processor to code the BIRD parameters comprise instructions that cause the processor to:
code a number representative of a number of iterations of a loop of the HRD parameters, each of the iterations of the loop corresponding to one of the sub-layers; and
code the HRD parameters for each of the sub-layers in a corresponding one of the loop iterations.

30. The non-transitory computer-readable storage medium of claim 28, wherein the instructions that cause the processor to code the BIRD parameters comprise instructions that cause the processor to:
code a plurality of sets of HRD parameters; and
code indexes for each of the sub-layers such that the index for each sub-layer represents one of the sets of BIRD parameters that corresponds to the sub-layer.

* * * * *